United States Patent
Ko et al.

(10) Patent No.: US 7,616,365 B2
(45) Date of Patent: Nov. 10, 2009

(54) ELECTROMAGNETIC MICRO ACTUATOR AND METHOD OF MANUFACTURING THE SAME

(75) Inventors: Young-chul Ko, Yongin-si (KR);
Jin-woo Cho, Yongin-si (KR);
Hee-moon Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 11/710,432

(22) Filed: Feb. 26, 2007

(65) Prior Publication Data
US 2008/0054732 A1 Mar. 6, 2008

(30) Foreign Application Priority Data
Sep. 1, 2006 (KR) .............. 10-2006-0084239

(51) Int. Cl.
G02B 26/10 (2006.01)
B81B 3/00 (2006.01)
B81B 1/00 (2006.01)

(52) U.S. Cl. .............. 359/224.1; 335/222; 359/198.1; 359/223.1

(58) Field of Classification Search .............. 310/36; 359/198.1, 200.7, 201.1, 202, 1, 203.1, 213.1, 359/223, 224, 225.1, 226.2, 298; 257/420
See application file for complete search history.

(56) References Cited

U.S. PATENT DOCUMENTS

| | | | |
|---|---|---|---|
| 6,404,313 B2 * | 6/2002 | Asada | 335/222 |
| 6,774,445 B2 * | 8/2004 | Mutoh et al. | 257/415 |
| 6,781,732 B2 * | 8/2004 | Cho et al. | 359/224.1 |
| 6,894,823 B2 * | 5/2005 | Taylor et al. | 359/291 |
| 7,148,591 B2 * | 12/2006 | Mizoguchi et al. | 310/36 |
| 7,224,507 B2 * | 5/2007 | Kamiya et al. | 359/290 |
| 2002/0050744 A1 | 5/2002 | Bernstein et al. | |
| 2002/0112963 A1 * | 8/2002 | Nakano et al. | 205/118 |
| 2002/0171901 A1 | 11/2002 | Bernstein | |
| 2003/0053186 A1 * | 3/2003 | Arima | 359/224 |
| 2003/0137711 A1 * | 7/2003 | Yagi et al. | 359/224 |
| 2004/0070806 A1 * | 4/2004 | Ryu et al. | 359/224 |
| 2004/0105139 A1 * | 6/2004 | Hirose et al. | 359/226 |
| 2008/0238592 A1 * | 10/2008 | Ko et al. | 335/222 |

FOREIGN PATENT DOCUMENTS

EP        1 255 150 A1   11/2002

* cited by examiner

Primary Examiner—Burton Mullins
(74) Attorney, Agent, or Firm—Sughrue Mion, PLLC

(57) ABSTRACT

A micro actuator and a method of manufacturing the micro actuator. A micro actuator includes a base frame, a first movable part, a second movable part, at least one pair of permanent magnets, a coil part, and a deformation suppression portion. The first movable part is rotatably connected to the base frame. The second movable part is rotatably connected to the first movable part and includes a mirror which changes an optical path. The coil part includes a plurality of coil sections protruded from top surfaces of the first and second movable parts. The deformation suppression portion includes a plurality of grooves formed in the first and second movable parts between the coil sections. The deformation suppression portion suppresses a thermal deformation, which occurs when a current is applied to the coil part, so as to reduce deformations of the first and second movable parts.

6 Claims, 7 Drawing Sheets

ELECTROMAGNETIC MICRO ACTUATOR AND METHOD OF MANUFACTURING THE SAME

CROSS-REFERENCE TO RELATED PATENT APPLICATION

This application claims priority from Korean Patent Application No. 10-2006-0084239, filed on Sep. 1, 2006 in the Korean Intellectual Property Office, the disclosure of which is incorporated herein in its entirety by reference.

BACKGROUND OF THE INVENTION

1. Field of the Invention

Apparatuses and methods consistent with the present invention relate to an electromagnetic micro actuator and a method of manufacturing the electromagnetic micro actuator.

2. Description of the Related Art

A scanner, which is used in a large-sized display device, such as a micro actuator for deflecting a laser beam using an electromagnetic force or effect, typically includes at least one permanent magnet, a moving plate, and a mirror provided on the moving plate to change an optical path. The moving plate includes a coil part receiving a current. As an electric force generated by a current applied to the coil part interacts with a magnetic force generated by the permanent magnets, the moving plate is rotated. Thus, the angle of the mirror can be adjusted using this rotation of the moving plate. For this reason, the scanner using the electromagnetic effect includes the coil part that receives a current. Such a coil part formed in a substrate is shown in FIGS. 1A and 1B.

FIGS. 1A and 1B are cross-sectional views illustrating a coil part 40 formed in a substrate 20.

Referring to FIG. 1A, a metal layer 30 is formed on the substrate 20, and the coil part 40 is formed on the metal layer 30 and includes a plurality of coil sections 41 spaced a predetermined distance from each other. Referring to FIG. 1B, the coil part 40 with the coil sections 41 is disposed in the substrate 20 to a predetermined depth from an upper side of the substrate 20. The substrate 20 is formed of Si and the coil part 40 is formed of a high thermal conductivity metal.

FIG. 2 is a view illustrating a substrate 20 which is deformed by thermal expansion when a current is applied to a coil part 41. Referring to FIG. 2, as a current is applied to the coil 41, heat is generated, deforming the coil 41. The deformation of the coil 41 affects the substrate 20, causing the substrate 20 to deform by δ in its longitudinal direction. The thermal expansion coefficient of Si forming the substrate 20 is smaller than that of Cu forming the coil 41. Therefore, when heat is generated by a current applied to a coil part 40 formed of the coil sections 41, the deformation of the Si forming the substrate 20 is negligible since the Si is not sensitive to heat. However, the thermal expansion of the Cu of the coil part 40 is not negligible, thereby causing the deformation of the substrate 20. When the substrate 20 is deformed, a mirror connected to the substrate 20 is also affected. Therefore, the optical characteristics and structural reliabilities of the micro and other optical components are deteriorated.

SUMMARY OF THE INVENTION

Exemplary embodiments of the present invention provide a micro actuator including a deformation suppression portion that reduces a deformation of a substrate when a current is applied to a coil part formed at the substrate, and a method of manufacturing the micro actuator.

According to an aspect of the present invention, there is provided a micro actuator including: a base frame; a first movable part rotatably connected to the base frame; a second movable part rotatably connected to the first movable part and including a mirror changing an optical path; at least one pair of permanent magnets; a coil part including a plurality of coil sections protruded from top surfaces of the first and second movable parts; and a deformation suppression portion including a plurality of grooves formed in the first and second movable parts between the coil sections, wherein the deformation suppression portion suppresses a thermal deformation occurring when a current is applied to the coil part so as to reduce deformations of the first and second movable parts.

According to another aspect of the present invention, there is provided a method of manufacturing a micro actuator, the method comprising preparing a substrate; forming a mold layer on the substrate; and after forming the mold layer on the substrate, forming a plurality of trenches in the mold layer. The method further comprises filling a conductive material into the trenches using electroplating so as to form a coil part comprising a plurality of coil sections; removing the mold layer; and etching portions of the substrate located between the coil sections of the coil part to form a deformation suppression portion comprising a plurality of grooves.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1A:
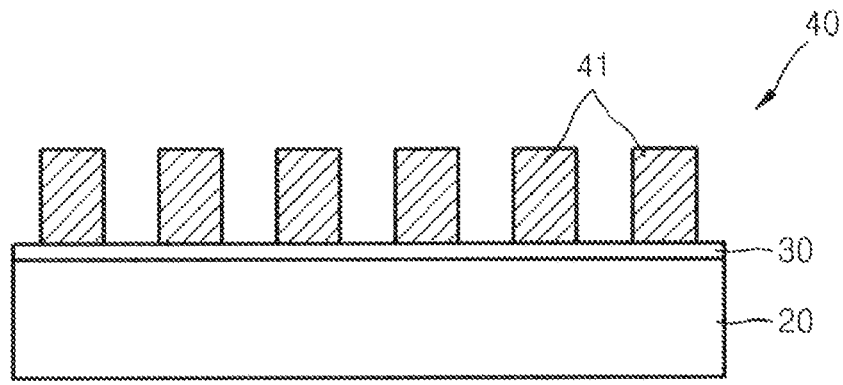
FIGS. 1A and 1B are cross-sectional views illustrating a coil part formed in a substrate.
Figure 1B:
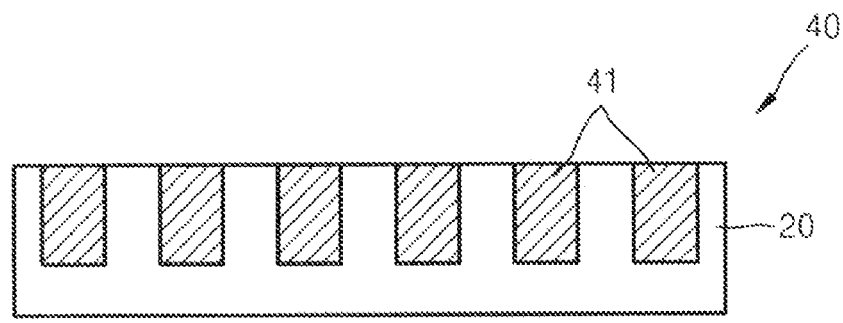
Figure 2:
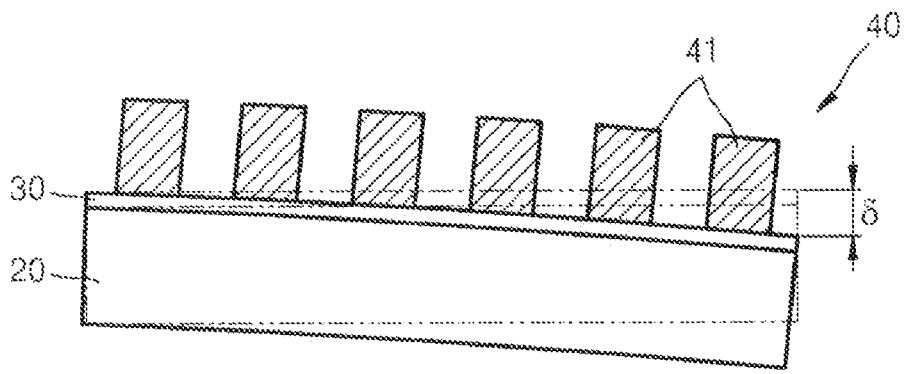
FIG. 2 is a view illustrating a substrate which is deformed by thermal expansion when a current is applied to a coil part.
Figure 3:
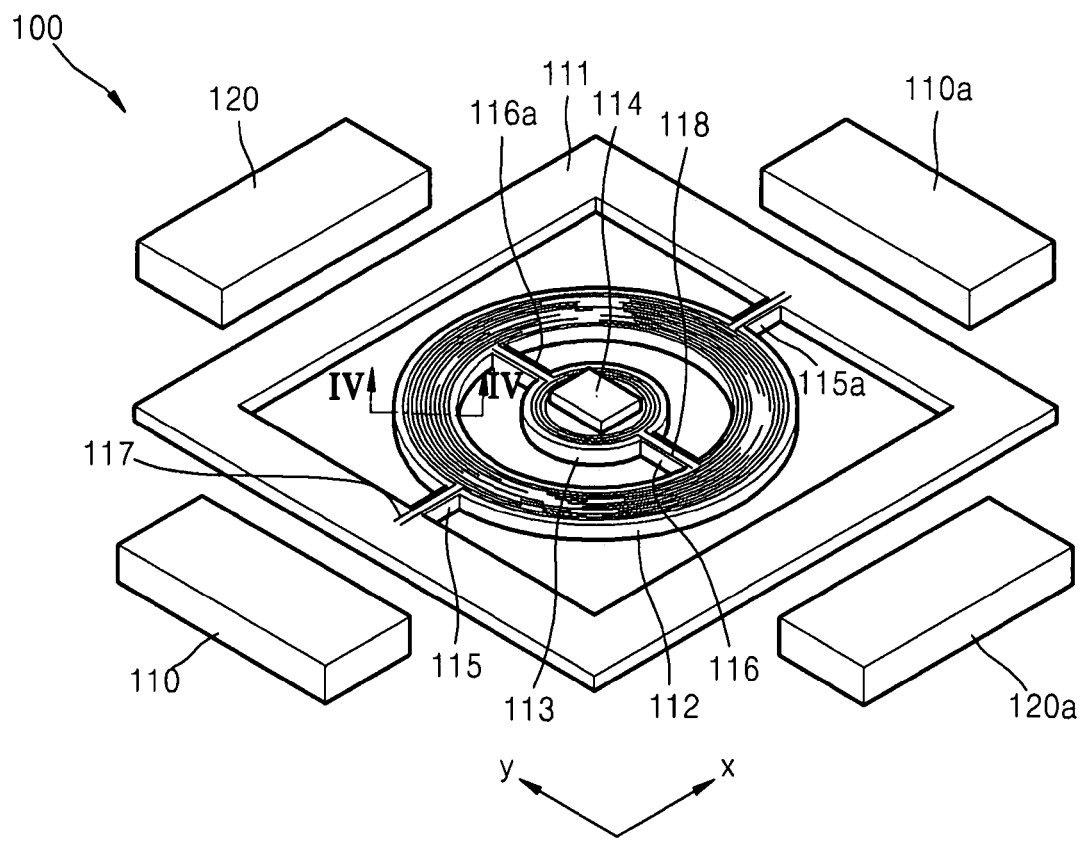
FIG. 3 is a perspective view schematically illustrating a micro actuator acted upon by an electromagnetic force.

Referring to FIG. 3, a micro actuator 100, utilizing an electromagnetic effect or force, includes a pair of mutually facing permanent magnets 110 and 110a disposed in an X-axis direction, a pair of mutually facing permanent magnets 120 and 120a disposed in an Y-axis direction, a base frame 111 disposed between the two pair of permanent magnets 110, 110a, 120, and 120a, and a mirror 114 formed on a second movable part 113 disposed inside the base frame 111.

The second movable part 113 is connected to a first movable part 112 which is connected to the base frame 111. The first movable part 112 is rotatably connected to the base frame 111 by a pair of first supporting parts 115 and 115a facing each other. The second movable part 113 is rotatably connected to the first movable part 112 by a pair of second supporting parts 116 and 116a facing each other.

The first supporting parts 115 and 115a are perpendicular to the second supporting parts 116 and 116a. The permanent magnets 110, 110a, 120, and 120a are disposed to face the first and second supporting parts 115, 115a, 116 and 116a, respectively.

That is, the permanent magnets 110 and 110a and the first supporting parts 115 and 115a are located in the X-axis direction, while the permanent magnets 120 and 120a and the second supporting parts 116 and 116a are located in the Y-axis direction.

A first coil part 117 is formed on an upper side of the first movable part 112, and a second coil part 118 is formed on an upper side of the second movable part 113.

Figure 4:
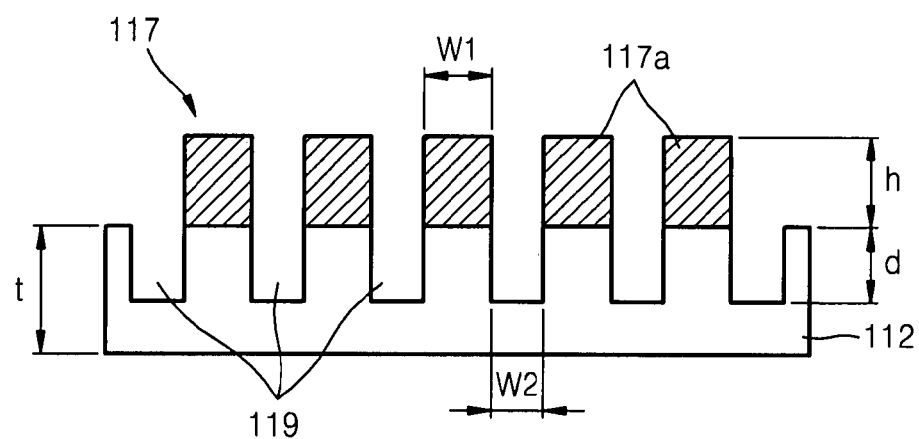
FIG. 4 is a cross-sectional view taken along line IV-IV of FIG. 3.

Referring to FIG. 4, the first coil part 117 includes a plurality of coil sections 117a spaced a predetermined distance from each other and protruded from the upper side of the first movable part 112. The first movable part 112 is dug to a predetermined depth (d) to form a deformation suppression portion or portions 119 at both sides of the coil sections 117a in the form of grooves. Likewise, the upper side of the second movable part 113 includes a deformation suppression portion 119 similar to that formed on the first movable part 112.

The deformation suppression portion 119 reduces thermal deformation effects exerted on the first and second movable parts 112 and 113 by the first coil part 117 and the second coil part 118. The thermal expansion coefficients of the first and the second coil parts 117 and 118 to which a current is applied are larger than those of the first and second movable parts 112 and 113. Therefore, when a current is applied to the first coil part 117 and the second coil part 118, the first coil part 117 and the second coil part 118 are deformed due to thermal expansion. Since the deformation suppression portion 119 absorbs the deformation of the first and second coil parts 117 and 118, the first and second movable part 112 and 113 can be less affected by the deformation.

Table 1 below shows the deformation of the first and second movable parts 112 and 113 as a function of the depth d of the deformation suppression portion 119.

In FIG. 4, W1 denotes the width of the coil sections 117a, h denotes the height of the coil sections 117a, W2 denotes the space between the coil sections 117a, t denotes the thickness of the first movable part 112, and d denotes the depth of the deformation suppression portion 119.

Table 1 below shows deformations of the first movable part 112 when a current is applied to the coil sections 117a and d is 1 μm, 2 μm, and 3 μm, respectively. The deformations of the first movable part 112, shown in Table 1 were obtained when W1=15 μm, h=10 μm, W2=10 μm, t=40 μm.

In particular, when W1=15 μm, h=10 μm, W2=10 μm, and t=40 μm, a current was applied to the coil sections 117a while varying the d from 1 μm to 3 μm, and deformation of the first movable part 112 was measured. Without the deformation suppression portion 119, the deformation of the first movable part 112 was 0.514 μm.

TABLE 1

| | DEPTH(d) | | |
|---|---|---|---|
| | 1 μm | 2 μm | 3 μm |
| DEFORMATION SUPPRESSION RATIO | −44%(0.287 μm/ 0.514 μm) | −70%(0.152 μm/ 0.514 μm) | −85%(0.079 μm/0.514 μm) |

Figure 5:
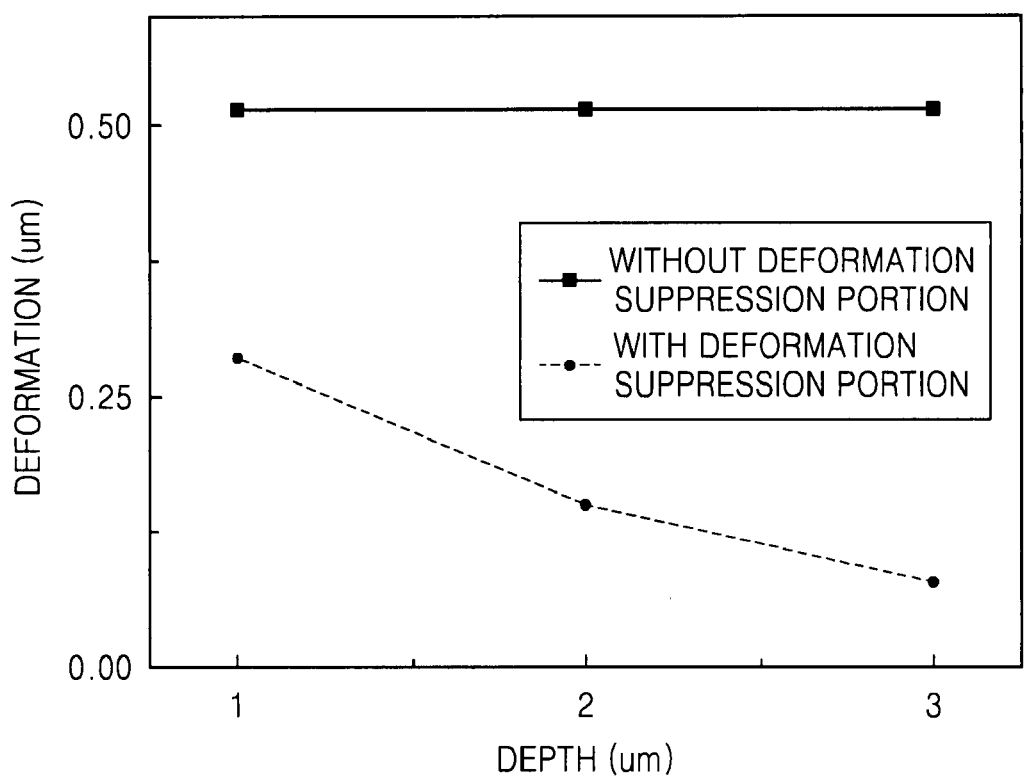
FIG. 5 is a graph illustrating deformation verses depth of a deformation suppression portion according to an exemplary embodiment of the present invention.

Referring to Table 1 and FIG. 5, when the depth (d) of the deformation suppression portion 119 is 1 μm, the deformation of the first movable part 112 is 0.287 μm. Therefore, when compared to the deformation (0.514 μm) of the first movable part 112 without the deformation suppression portion 119, the deformation is reduced by 44%.

Also, when the depth (d) of the deformation suppression portion 119 is 2 μm, the deformation of the first movable part 112 is 0.152 μm. Therefore, when compared to the deformation (0.514 μm) of the first movable part 112 without the deformation suppression portion 119, the deformation is reduced by 70%.

In addition, when the depth (d) of the deformation suppression portion 119 is 3 μm, the deformation of the first movable part 112 is 0.079 μm. Therefore, when compared to the deformation (0.514 μm) of the first movable part 112 without the deformation suppression portion 119, the deformation is reduced by 85%.

As a result, when the depth (d) of the deformation suppression portion 119 is increased, the deformation of the first movable part 112 is lowered. When a current is applied to the coil sections 117a, the thermal deformation of the coil sections 117a does not affect the deformation suppression portion 119, but is transmitted to portions of the first movable part 112 located beneath the coil sections 117a. Therefore, when the depth (d) of the deformation suppression portion 119 is increased, the deformation of the first movable part 112 can be reduced more effectively. Also, when the depth (d) of the deformation suppression portion 119 is increased, the area ratio of the deformation suppression portion 119 to the first movable part 112 is increased. Therefore, the first movable part 112 is less affected by the thermal deformation of the coil sections 117a.

The electric force, which is generated by a current applied to the first coil part 117 and the second coil part 118, interacts with the magnetic force generated by the permanent magnet 110, 110a, 120, and 120a (a resultant force of this kind of interaction is called a Lorentz force). The Lorentz force rotates the first movable part 112 and the second movable part 113.

The above-described structure of the micro actuator 100 is provided as an example for explaining characteristic elements of the present invention (i.e., the deformation suppression portion 119). It will be appreciated that the number and arrangement of the permanent magnets, the number and features of the movable parts, and the arranged position of the coil parts can be changed according to operational conditions of the micro actuator 100. That is, the structure of the micro actuator 100 is not limited to the structure illustrated in FIG. 3.

The exemplary embodiments of the present invention are characterized by the deformation suppression portion formed at both sides of the coil sections of the coil part. That is, when two elements having different thermal expansion coefficients are coupled, a deformation suppression portion is formed by removing portions of one element having a relatively small thermal expansion coefficient, so that the element having a relatively small thermal expansion coefficient can be prevented from being deformed by the thermal deformation of the other element having a large thermal expansion coefficient.

Figure 6:
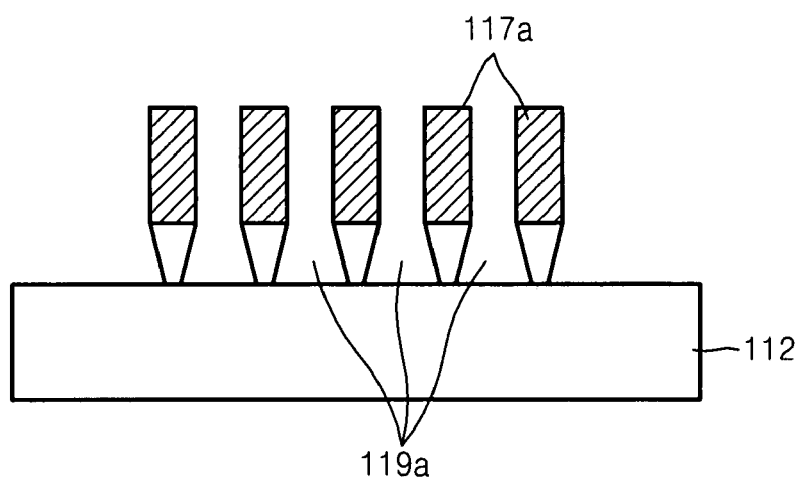
FIGS. 6 through 8 are views illustrating various sections of a deformation suppression portion according to an exemplary embodiment.
Figure 7:
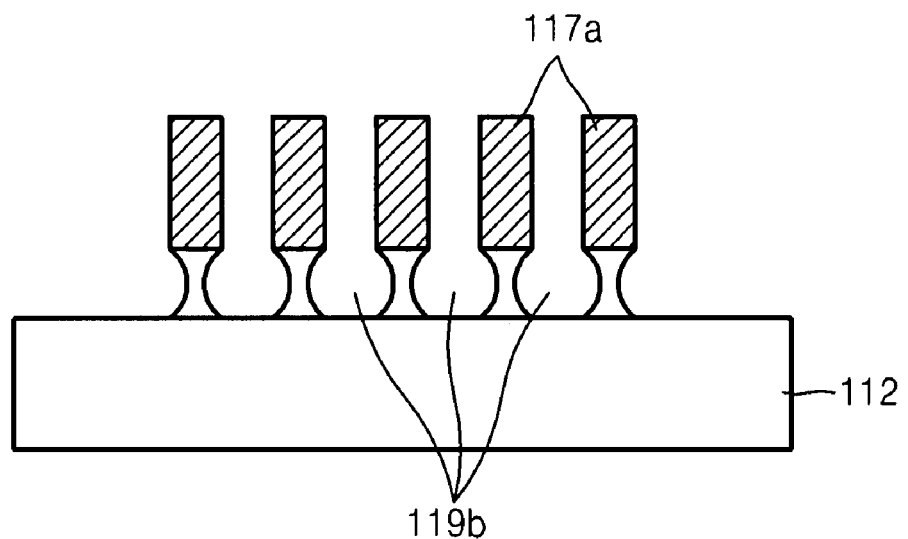
Figure 8:
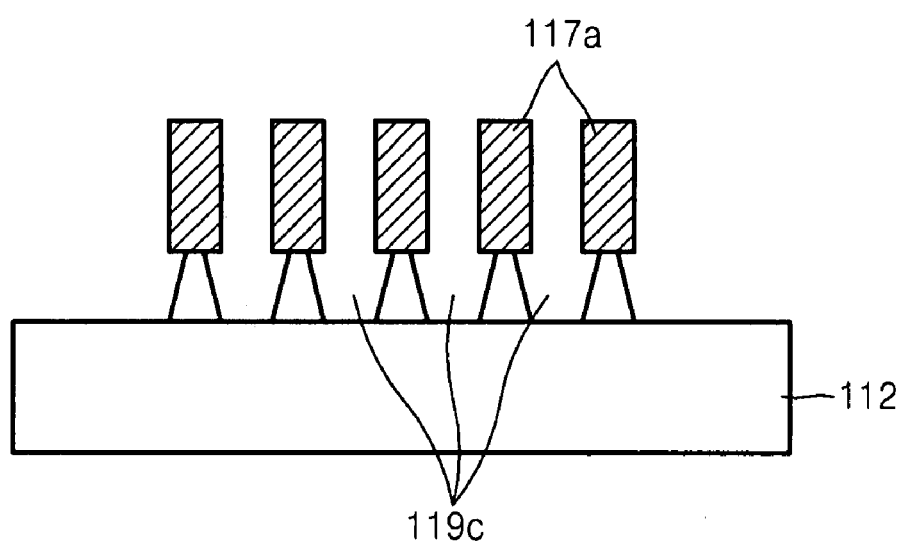

FIGS. 6 through 8 are views illustrating various sections of deformation suppression portions according to embodiments of the present invention. FIG. 6 is a view illustrating a deformation suppression portion 119a having a trapezoidal cross sectional shape. FIG. 7 is a view illustrating a deformation suppression portion 119b having an oval cross-sectional shape. FIG. 8 is a view illustrating a deformation suppression portion 119c having a reverse trapezoidal cross-section shape.

Referring to FIGS. 6 through 8, the deformation suppression portions 119a, 119b, and 119c having various sectional shapes can be formed using different etching methods. That is, the exemplary embodiments of the present invention are not limited to the widths or the sectional shapes of the deformation suppression portions 119a, 119b, and 119c illustrated in FIGS. 6 through 8. The cross-sectional shape of the deformation suppression portion can vary.

Figure 9:
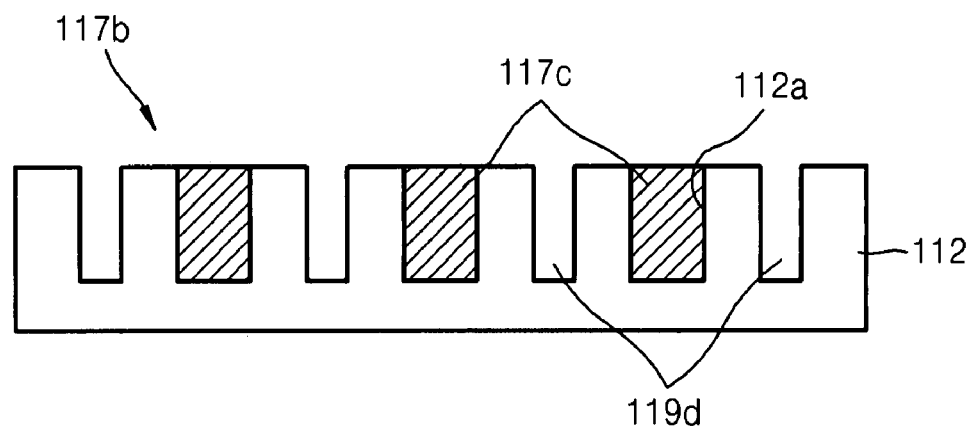
FIG. 9 is a cross-sectional view illustrating a coil part and a deformation suppression portion according to an exemplary embodiment.

FIG. 9 is a cross-sectional view illustrating a coil part and a deformation suppression portion that are different from those shown in FIG. 4 according to an embodiment of the present invention.

Referring to FIG. 9, unlike the coil part Illustrated in FIG. 4, a coil part 117b is formed of a plurality of coil sections 117c which are respectively filled in a plurality of grooves 112a. A first movable part 112 is dug or processed to have a predetermined depth to form the grooves 112a. Portions of the first movable part 112 located between the coil sections 117c are dug or processed to a predetermined depth to form the deformation suppression portion 119d.

A method of manufacturing a micro actuator including a deformation suppression portion will now be described.

FIGS. 10A through 10G are views for explaining a method of manufacturing a micro actuator including a deformation suppression portion according to an exemplary embodiment of the present invention. The manufacturing method is performed using a micro electromechanical systems (MEMS) process. Since the MEMS process is well known, a detailed description of the MEMS process will be omitted.

Figure 10A:
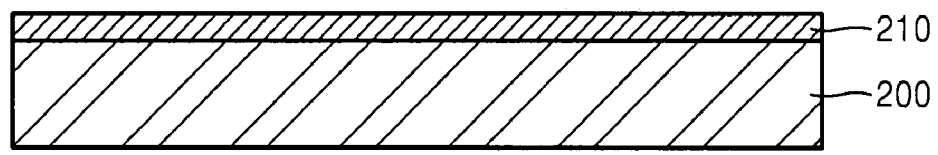
FIGS. 10A through 10G are views illustrating a method of manufacturing a micro actuator including a deformation suppression portion according to exemplary embodiments of the present invention.

Referring to FIG. 10A, an oxide layer $SiO_2$ 210 is formed on an upper side of a substrate 200 formed of Si.

Figure 10B:
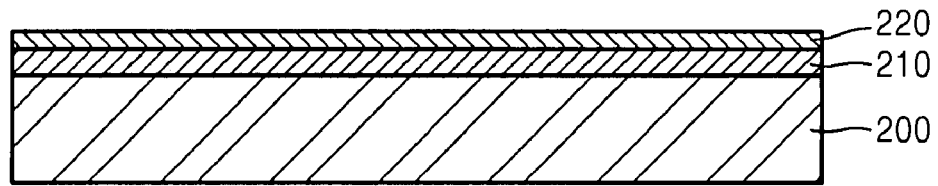

Referring to FIG. 10B, a seed metal layer 220 is formed on the oxide layer 210 of the substrate 200.

Figure 10C:
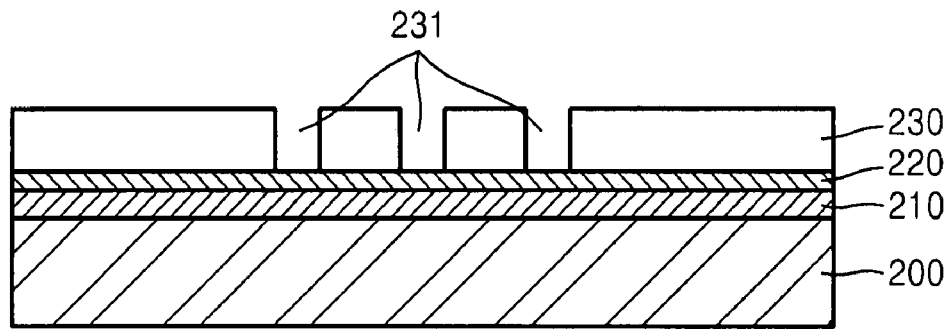

Referring to FIG. 10C, a mold layer 230 is formed on the seed metal layer 220 by coating the seed metal layer 220 with photoresist. Then, the mold layer 230 is patterned into using a photo mask (not shown), and a plurality of trenches 231 are formed in the mold layer 230 by removing patterned portions of the mold layer 230.

Figure 10D:
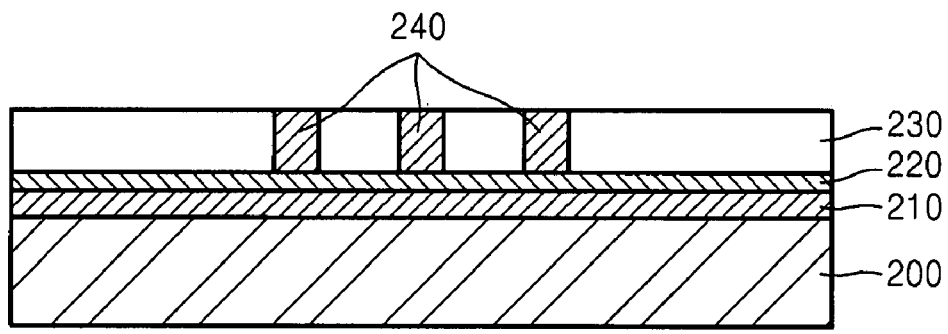

Referring to FIG. 10D, a coil part 240 including a plurality of coil sections is formed by filling the trenches 231 with a conductive material using electroplating.

Figure 10E:
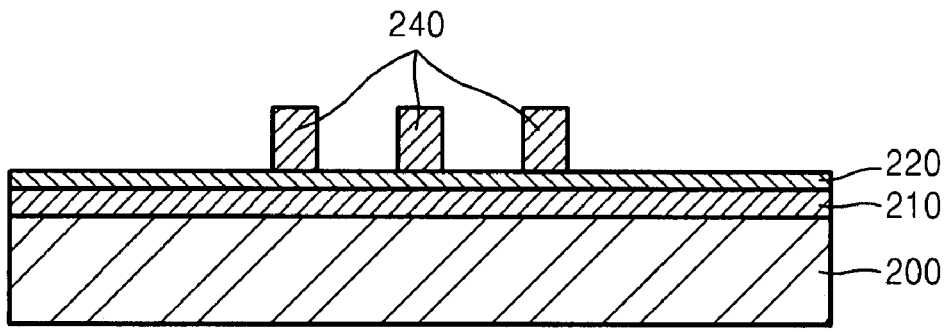

Referring to FIG. 10E, the mold layer 230 is removed to expose the seed metal layer 220 and the coil part 240.

Figure 10F:
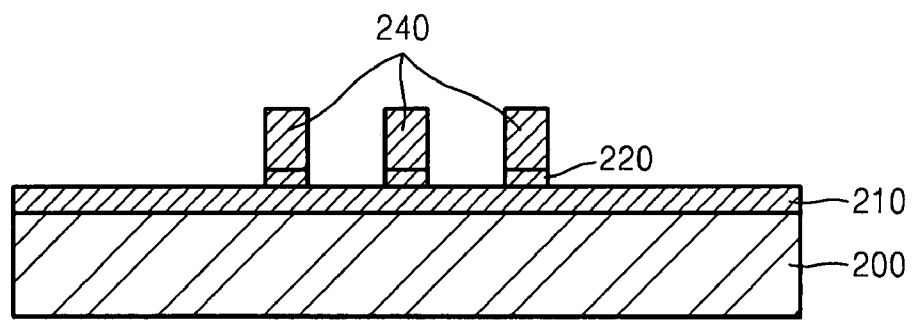

Referring to FIG. 10F, the seed metal layer 220 is removed, except for portions of the seed metal layer 220 located under the coil part 240. Therefore, the oxide layer 210 is exposed except for portions of the oxide layer 210 located under the coil part 240.

Figure 10G:
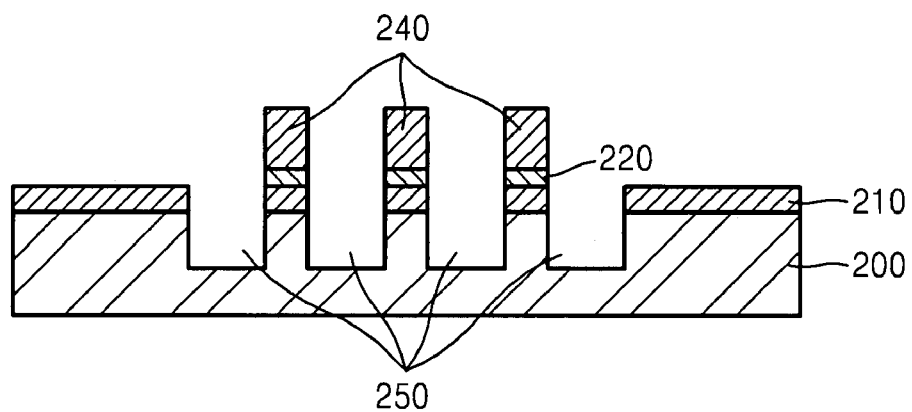

Referring to FIG. 10G, grooves are formed by removing portions of the oxide layer 210 and the substrate 200 located between the coil sections of the coil part 240, so as to provide a predetermined depth and width, thereby forming a deformation suppression portion 250 in the form of grooves.

As described above, the micro actuator and the method of manufacturing the micro actuator of the exemplary embodiments of the present invention provide exemplary aspects as follows.

First, the thermal deformation of the substrate caused by the difference of the thermal expansion coefficients between the coil part and the substrate can be reduced.

Secondly, peeling off of the coil part can be prevented by reducing the deformation of the substrate.

Thirdly, since the substrate is less deformed, the deformation of the supporting part connected to the substrate is reduced. Therefore, the deformation of the mirror can be prevented, and the optical characteristics, the structural reliability, and the linearity of the micro actuator can be improved.

What is claimed is:

1. A micro actuator comprising:
   a base frame;
   a first movable part rotatably connected to the base frame;
   a second movable part rotatably connected to the first movable part and including a mirror which changes an optical path of incident light;
   at least one pair of permanent magnets disposed outside the base frame;
   a coil part including a plurality of coil sections protruded from the first movable part and the second movable part; and
   a deformation suppression portion comprising a plurality of grooves formed in the first movable part and the second movable part between the coil sections,
   wherein the deformation suppression portion suppresses a thermal deformation occurring when a current is applied to the coil part so as to reduce deformations of the first movable part and the second movable part.

2. The micro actuator of claim 1, wherein the first movable part and the second movable part comprise grooves and the coil part is disposed in grooves.

3. The micro actuator of claim 2, wherein the deformation suppression portion comprises an etched area of the first and second movable parts.

4. The micro actuator of claim 1, wherein the deformation suppression portion comprises an etched area of the first and second movable parts.

5. The micro actuator of claim 1, wherein the coil part has a thermal expansion coefficient larger than that of the first and second movable parts.

6. The micro actuator of claim 1, wherein the coil part protrudes from top surfaces of the first movable part and the second movable part.

\* \* \* \* \*